(12) United States Patent
Tilley et al.

(10) Patent No.: US 11,468,487 B2
(45) Date of Patent: Oct. 11, 2022

(54) APPARATUS AND METHOD OF COMMUNICATING INFORMATION ABOUT A PACKAGED FOOD PRODUCT

(71) Applicant: Tyson Foods, Inc., Springdale, AR (US)

(72) Inventors: Erin Tilley, Springdale, AR (US); Jake Wiedower, Rogers, AR (US)

(73) Assignee: TYSON FOODS, INC., Springdale, AR (US)

( * ) Notice: Subject to any disclaimer, the term of this patent is extended or adjusted under 35 U.S.C. 154(b) by 63 days.

(21) Appl. No.: 16/789,153

(22) Filed: Feb. 12, 2020

(65) Prior Publication Data

US 2021/0248657 A1 Aug. 12, 2021

(51) Int. Cl.

| | |
|---|---|
| *G06Q 30/06* | (2012.01) |
| *G06Q 30/02* | (2012.01) |
| *G06N 5/04* | (2006.01) |
| *G06N 20/00* | (2019.01) |
| *G06Q 30/00* | (2012.01) |

(52) U.S. Cl.
CPC .......... *G06Q 30/0623* (2013.01); *G06N 5/04* (2013.01); *G06N 20/00* (2019.01); *G06Q 30/014* (2013.01); *G06Q 30/0269* (2013.01); *G06Q 30/0631* (2013.01); *G06Q 30/0185* (2013.01)

(58) Field of Classification Search
None
See application file for complete search history.

(56) References Cited

U.S. PATENT DOCUMENTS

| | | | | |
|---|---|---|---|---|
| 7,299,988 | B2* | 11/2007 | Kitada | G06K 7/10 |
| | | | | 235/472.01 |
| 9,195,960 | B2* | 11/2015 | Kim | G06Q 10/087 |
| 10,185,981 | B2* | 1/2019 | Hodges | G06F 16/9566 |
| 2006/0049259 | A1* | 3/2006 | Kitada | G06Q 30/02 |
| | | | | 235/451 |
| 2009/0327939 | A1* | 12/2009 | Johns | G11B 27/34 |
| | | | | 715/765 |
| 2014/0045433 | A1* | 2/2014 | Kim | F25D 29/00 |
| | | | | 455/66.1 |
| 2014/0379465 | A1* | 12/2014 | Brazell | G06Q 30/0269 |
| | | | | 705/14.51 |

(Continued)

OTHER PUBLICATIONS

Lazzari, G., et al., "FoodRepo: An Open Food Repository of Barcoded Food Products," Frontiers in Nutrition 5 (2018): 57, pp. 4333-4346. (Year: 2018).*

*Primary Examiner* — Nicholas D Rosen
(74) *Attorney, Agent, or Firm* — Duane Morris LLP

(57) ABSTRACT

An apparatus for delivering information to a mobile computing device regarding a packaged food product includes an information delivery computing device comprising a processor and non-transitory memory. The non-transitory memory includes executable instructions that when executed by the processor cause the information delivery computing device to send information about one or more characteristics of the packaged food product to the mobile computing device in response to a request from the mobile computing device. The request from the mobile computing device can be received by the information delivery computing device when a customer scans a QR code on the packaged food product with a camera on the mobile computing device.

17 Claims, 10 Drawing Sheets

(56) References Cited

U.S. PATENT DOCUMENTS

| | | | |
|---|---|---|---|
| 2015/0221011 A1* | 8/2015 | Kavanagh | G06Q 30/0623 |
| | | | 705/26.61 |
| 2016/0267568 A1* | 9/2016 | Hodges | G06Q 30/0623 |
| 2017/0083921 A1* | 3/2017 | Espinoza | G06Q 30/014 |
| 2017/0315700 A1* | 11/2017 | Rolih | G06F 3/04817 |
| 2019/0087770 A1* | 3/2019 | Walsh | G06Q 10/087 |
| 2020/0250733 A1* | 8/2020 | Hullverson | G06V 40/10 |

* cited by examiner

APPARATUS AND METHOD OF COMMUNICATING INFORMATION ABOUT A PACKAGED FOOD PRODUCT

FIELD

The present disclosure relates to apparatuses and methods for communicating information about a packaged food product. More particularly, the present disclosure relates to apparatuses and methods for communicating information over a communication network about a packaged food product in response to a request for such information from a customer viewing the packaged food product.

BACKGROUND

This section provides background information related to the present disclosure which is not necessarily prior art.

Customers can be overwhelmed with the variety and number of packaged food products that may be available in a retail environment such as a grocery store. In such an environment, the customer is surrounded by shelves and displays of many types of packaged food products. Customers may not purchase some packaged food products because the customer is not familiar with the food product or its ingredients. Customers may also not purchase some packaged food products because the customer does not know how to prepare the packaged food product. Customers may also want to know more information about the ingredients, the packaging of the food product and/or the supply chain that manufactured, prepared, grew, or delivered the food product.

One type of packaged food product that customers may be reluctant to purchase because of one or more of the foregoing reasons is packaged meat products. Customers may not know what type of animal or from where on the animal that a particular cut of meat derives from. Customers may also not know how to prepare a particular cut of meat or know of recipes that incorporate a particular cut of meat. There exists a need therefore for improved methods and apparatuses that can deliver information about a packaged meat product or other food product to the customer.

SUMMARY

This section provides a general summary of the disclosure, and is not a comprehensive disclosure of its full scope or all of its features.

In some embodiments in accordance with the present disclosure, an apparatus for delivering information to a mobile computing device regarding a packaged food product includes an information delivery computing device comprising a processor and non-transitory memory. The non-transitory memory includes executable instructions that when executed by the processor cause the information delivery computing device to send information about one or more characteristics of the packaged food product to the mobile computing device in response to a request from the mobile computing device. The request from the mobile computing device can be received by the information delivery computing device when a customer scans a QR code on the packaged food product with a camera on the mobile computing device.

In one aspect, the one or more characteristics of the packaged food product comprises at least one of: product data, product use data, retailer data, recycle data, supply chain data and recall data.

In some embodiments in accordance with the present disclosure, a method of delivering information to a mobile computing device regarding a packaged food product is contemplated. The method may comprise receiving a request from a mobile computing device for information regarding a packaged food product, wherein the request is generated in response to a customer capturing image data from an indicator label on the packaged food product with the mobile computing device. The method may also include sending information about one or more characteristics of the packaged food product to the mobile computing device.

In some embodiments in accordance with the present disclosure, an information delivery system may include an information delivery computing device connected to a communication network. The information delivery computing device can be configured to receive, via a transceiver, a request from a mobile computing device for information regarding a packaged food product, wherein the request is generated in response to a customer capturing image data from an indicator label on the packaged food product with the mobile computing device. The information delivery computing device can also be configured to display on the mobile computing device a progressive web application comprising information identifying one or more characteristics of the packaged food product.

In some embodiments in accordance with the present disclosure, a non-transitory computer readable medium may include executable instructions stored thereon. The executable instructions, when executed by a processor of a computing device, may cause the computing device to perform operations that include receiving a request from a mobile computing device for information regarding a packaged food product, wherein the request is generated in response to a customer capturing image data from an indicator label on the packaged food product with the mobile computing device. The executable instructions may also cause the computing device to send information to be displayed in a progressive web application on the mobile computing device that identifies one or more characteristics of the packaged food product.

Further areas of applicability will become apparent from the description provided herein. The description and specific examples in this summary are intended for purposes of illustration only, and are not intended to limit the scope of the present disclosure.

DRAWINGS

The drawings described herein are for illustrative purposes only of selected embodiments and not all possible implementations, and are not intended to limit the scope of the present disclosure.

Figure 6:
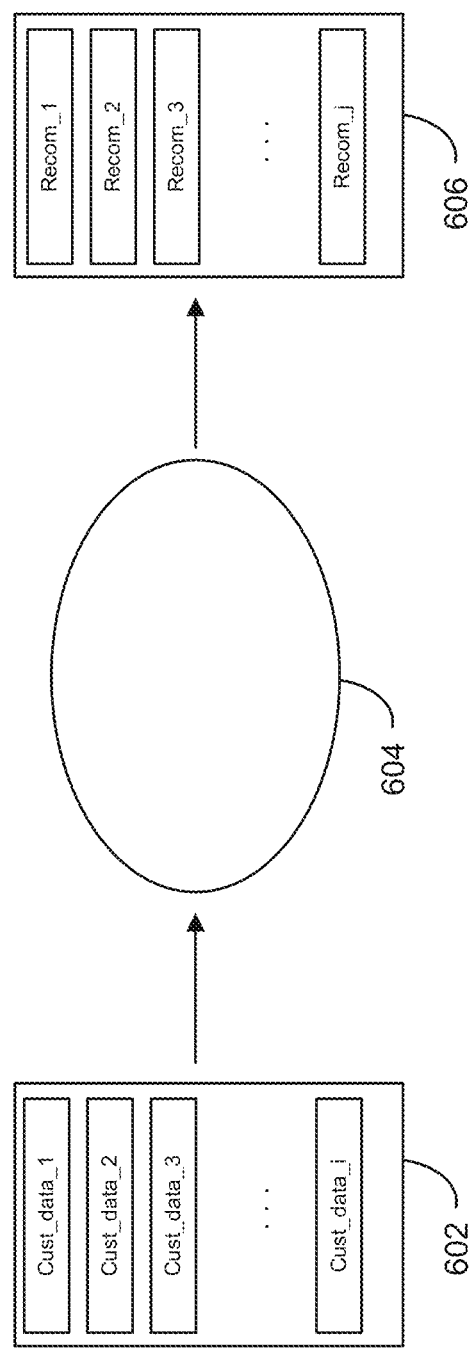
Figure 7:
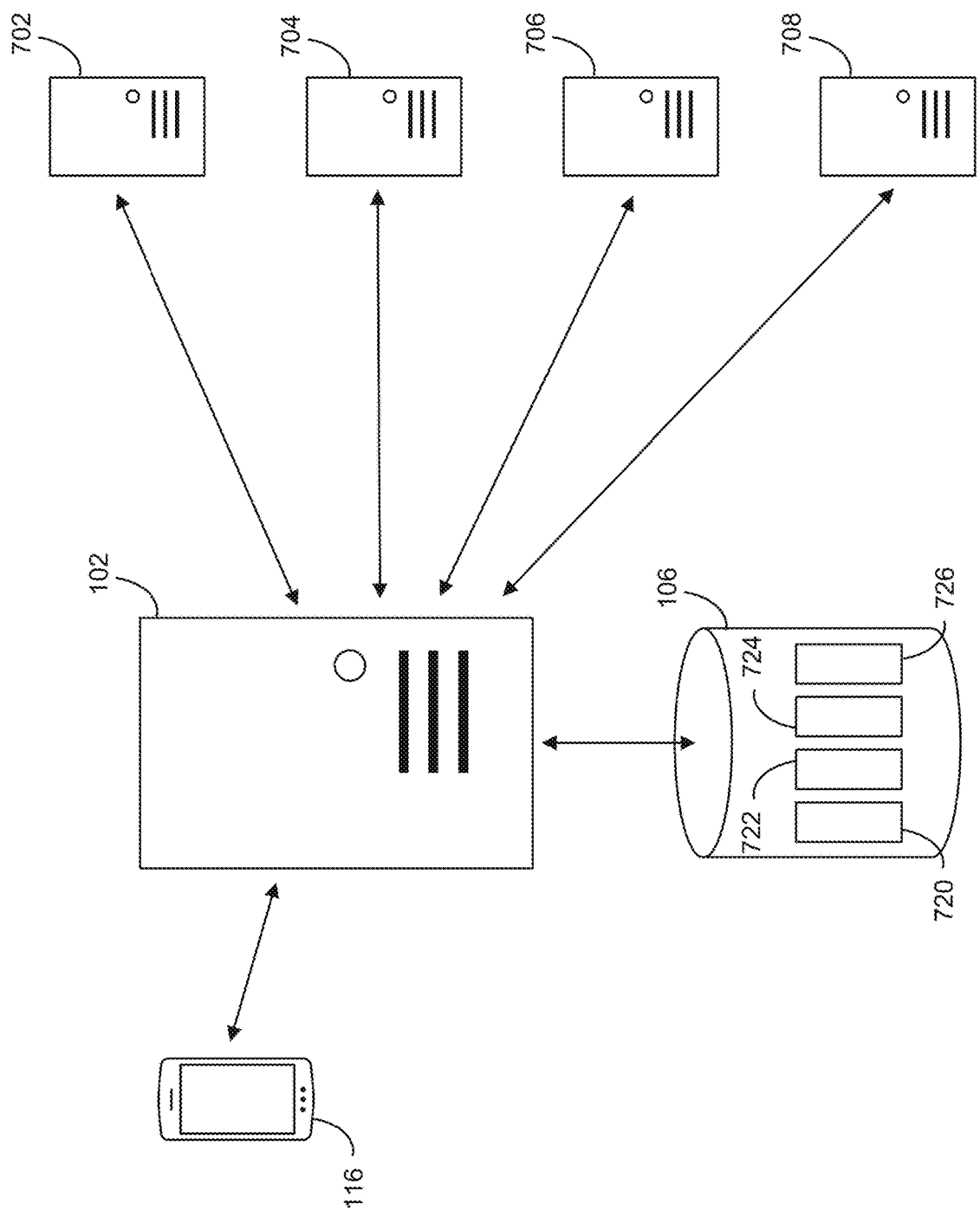
Figure 8:
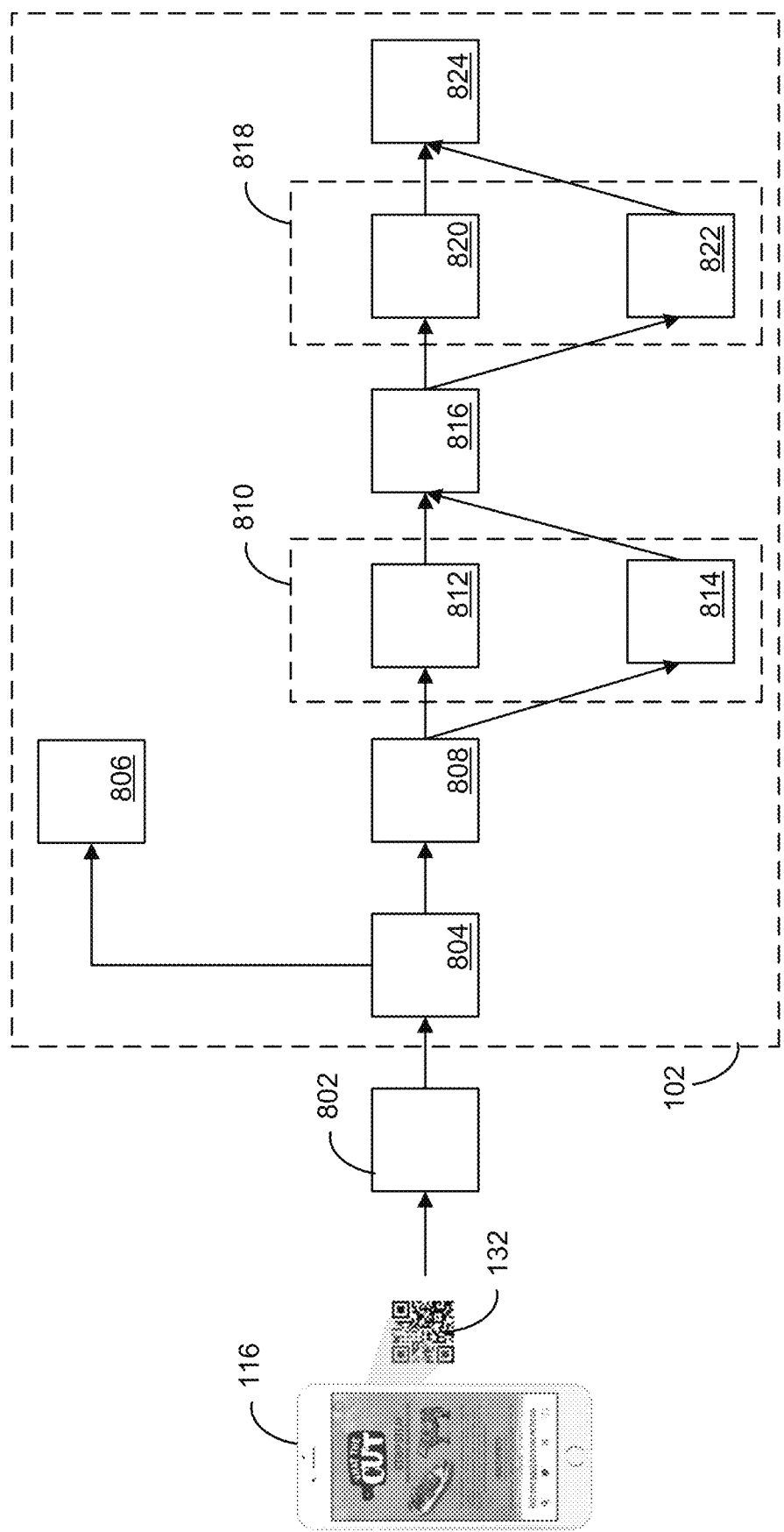

FIGS. 5A-F are illustrations of example user interfaces of the information delivery application of the present disclosure;

FIG. 6 is an illustration of example input data and output data that can be used in connection with a data model of the present disclosure;

FIG. 7 is an illustration of an example information delivery computing device and third party data sources in accordance with some embodiments of the present disclosure; and FIG. 8 is an illustration of an example architecture of an information delivery system that can be used to deliver the information delivery application of the present disclosure.

Corresponding reference numerals indicate corresponding parts throughout the several views of the drawings.

DETAILED DESCRIPTION

Example embodiments will now be described more fully with reference to the accompanying drawings. For purposes of the description hereinafter, it is to be understood that the embodiments described below may assume alternative variations and embodiments. It is also to be understood that the specific articles, compositions, and/or processes described herein are exemplary and should not be considered as limiting. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The apparatuses and methods of the present disclosure allow information concerning a packaged food item to be delivered to a customer in response to the customer indicating an interest in obtaining such information. In some examples, the customer can scan an indicator label that is located on the packaged food product in order to indicate the customer's interest in obtaining more information about the packaged food product. The customer can scan the indicator label with a mobile computing device in a retail environment such as a grocery store or in a location after purchase. In response to scanning the label, the mobile computing device can receive information from an information delivery computing device. The information delivery computing device can be configured to deliver the information in a fast, reliable format that does not require the customer to download or register for any service.

In existing and/or conventional information delivery devices, a customer may be required to download an application from an application store. In other existing and/or conventional information delivery systems, the information concerning a packaged food product may be delivered via a website that requires the customer to download significant amounts of content unless such content is cached on the customer's mobile computing device. In either case, the time that it takes for such existing and/or conventional information delivery systems to deliver the content to the customer is unacceptable to the customer. Customers can be particularly sensitive to the amount of wait time to view delivered content when the customer is at a retail environment such as a grocery store. In addition, customers may not have high-speed data connections when shopping at retail environments.

The apparatuses and methods of the present disclosure are improvements over existing and conventional information delivery systems. The apparatuses and methods of the present disclosure allow the customer to access desired information without the need to search for the relevant content. An indicator label can be positioned on a packaged food product which can guide the customer to the relevant content quickly without the need to search or to navigate a complex application or website. The information can be delivered to the customer more quickly and with less data transfer because of the architecture and configuration of the information delivery computing devices and methods of the present disclosure.

The apparatuses and methods of the present disclosure are also improvements over existing and/or conventional information delivery systems because the apparatuses and methods of the present disclosure can be connected and/or can include other sources of information. The related methods of the present disclosure can deliver information of significant value in a quick and easy manner as previously discussed. These improvements can deliver increased sales, increased customer satisfaction and increased knowledge concerning the packaged food products that are offered in connection with the information delivery apparatuses and methods of the present disclosure.

Figure 1:
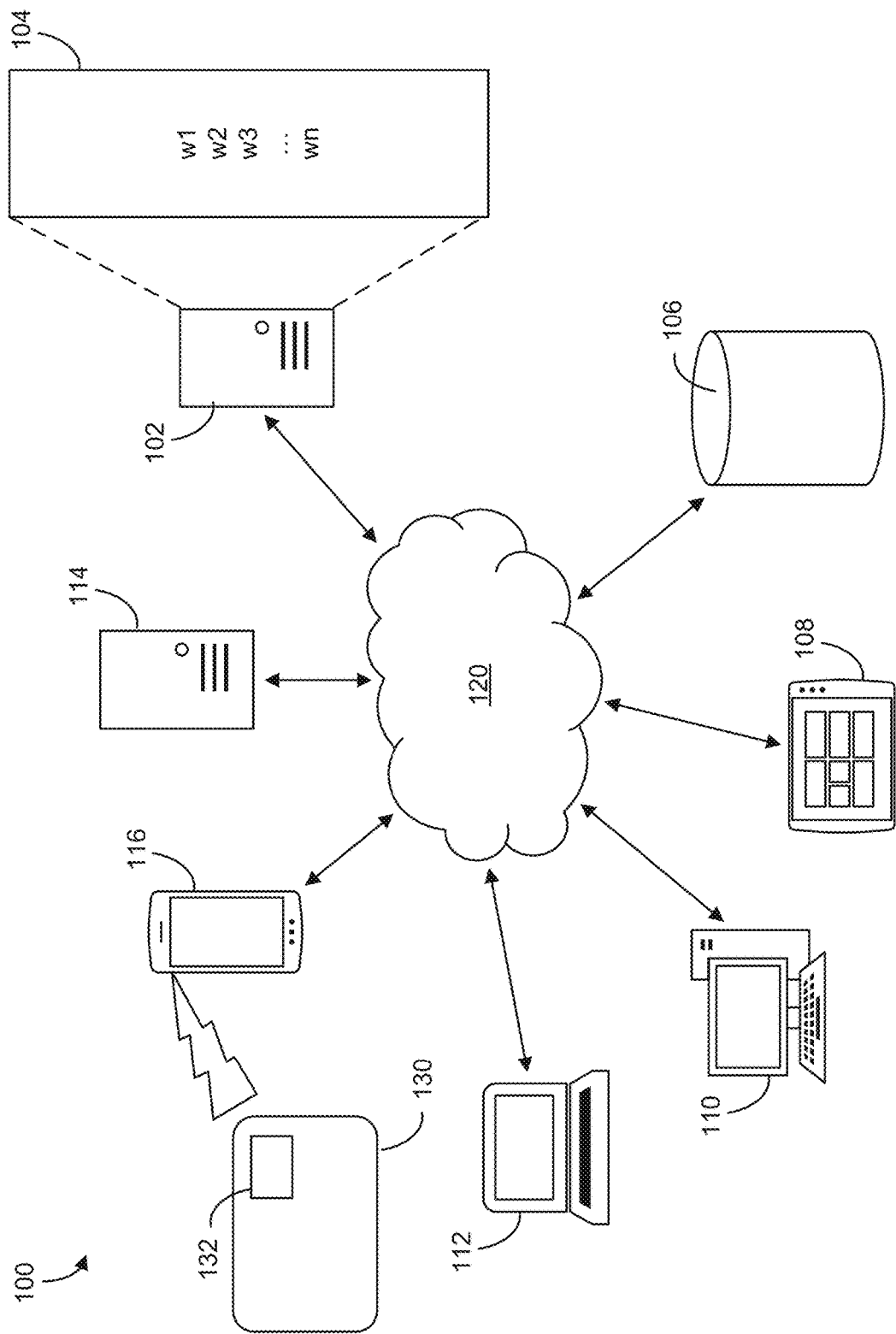
FIG. 1 is an illustration of an information communication system in accordance with some examples of the present disclosure.

Referring now to FIG. 1, an example information communication system 100 is shown. As shown, the information communication system can include an information delivery computing device 102, a database 106, a tablet computing device 108, a desktop computing device 110, a laptop computing device 112, a content server 114 and a mobile computing device 116. Each of these components can transmit data to and receive data from the network 120.

Each of the information delivery computing device 102, the tablet computing device 108, the desktop computing device 110, the laptop computing device 112, the content server 114 and the mobile computing device 116 can include one or more processors, one or more field-programmable gate arrays (FPGAs), one or more application-specific integrated circuits (ASICs), one or more state machines, digital circuitry, or any other suitable circuitry. The information delivery computing device 102 and the content server 114 can be a computer, workstation, laptop or server such as a web server, cloud-based server or the like. While one information delivery computing device 102 and one content server 114 is shown, in other embodiments, each of these elements and/or the functionality performed thereby can be embodied and/or performed by two or more computing devices located locally to one another or located remotely from one another.

The tablet computing device 108, the desktop computing device 110, the laptop computing device 112, the content server 114 and the mobile computing device 116 are examples of customer devices that can interact and/or communicate with the information communication system 100. In other examples, other customer devices can also interact and/or communicate with the communication system 100 such as cellular phones, smart phones, personal assistant devices, voice assistant devices, digital assistant devices and the like.

Database 106 can be a remote storage device, such as a cloud-based server, a memory device on another application server, a networked computer or other suitable storage device. In other examples, the database 106 can be a local storage device, such as a hard drive, non-volatile memory, USB stick or other portable storage device.

The network 120 can be any suitable communication network that permits the transfer of data. The network 120, for example, can be a cellular network such as a 3G, 4G or 5G network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The network 120 can, for example, provide access to the Internet.

As shown in the example of FIG. 1, the information communication system 100 can be used by a customer with a computing device, such as mobile computing device 116, to retrieve information regarding a packaged food product 130. The packaged food product 130 can include an indicator label 132 that has been positioned on an outer surface of the packaged food product 130 or is otherwise located on the packaged food product 130. The indicator label 132 can be positioned on the packaged food product 130 so that the indicator label 132 is visible and accessible to a customer that is shopping in a store, such as a grocery store. The customer can scan and/or capture an image of the indicator label 132 using the camera or other capture device of the mobile computing device 116. In one example, as will be further described, the indicator label 132 can include a matrix barcode, two-dimensional barcode, a quick response (QR) code, or other indicia of identification (each of which, separately or in combination, are referred to herein as "QR code"). The QR code can include identifying information that automatically directs the customer to an information delivery website or application that can deliver information to the customer on the mobile computing device 116 via the network 120.

In response to receiving a content request from the mobile computing device 116, the information delivery computing device 102, in one example, can deliver information or other content about the packaged food product 130 to the mobile computing device 116 via the network 120. The information content delivery device 102 can include one or more progressive website applications 104 (e.g., w1, w2, w3 . . . wn). The information content delivery device 102 can, for example, include a progressive website application 104 for each unique type of package food product 130. Thus, e.g., when a customer scans or otherwise images the indicator label 132 on the packaged food product 130, the mobile device 116 can automatically access the progressive website application (i.e., w1, w2, w3, wn) for the respective packaged food product 130.

As will be further described, the progressive website applications 104 that can be delivered to the mobile computing device 116 can include various elements of information about the packaged food product 130. The information about the packaged food product 130 can include, for example, descriptive information about the characteristics of the packaged food product, cooking information, ingredient information, nutritional information, packaging information, disposal information, recycling information, safety information, recipe information, source information, supply chain information, sustainability information and the like.

In addition to delivering information, the progressive website applications 104 can perform other functions in connection with or related to the packaged food item 130. Such other functions, as will be further described, can include recommending recipes, recommending other packaged food items, delivering shopping lists, alerting a customer about product deals or cost savings, providing disposal or recycling information about product packaging, or alerting customers to recall information for recalled products. In still other examples of the progressive website applications 104 other functionality and features can be included.

The information delivery computing device 102 can also access, store and/or retrieve information from other sources such as from database 106 and/or content server 114. The database 106 and/or the content server 114 may be operated by the same entity as the information delivery computing device 102. In other examples, the content server 114 and/or the database 106 can be operated by a third party. The information content delivery device 102, in either circumstance, can communicate with the database 106 and/or the content server 114 via the network 120 to access, store and/or retrieve information and deliver information to or receive information from the mobile computing device 116. As can be appreciated, the information content delivery device 102 can similarly deliver information to and/or retrieve information from the tablet computing device 108, the desktop computing device 110, and the laptop computing device 112.

Figure 2:
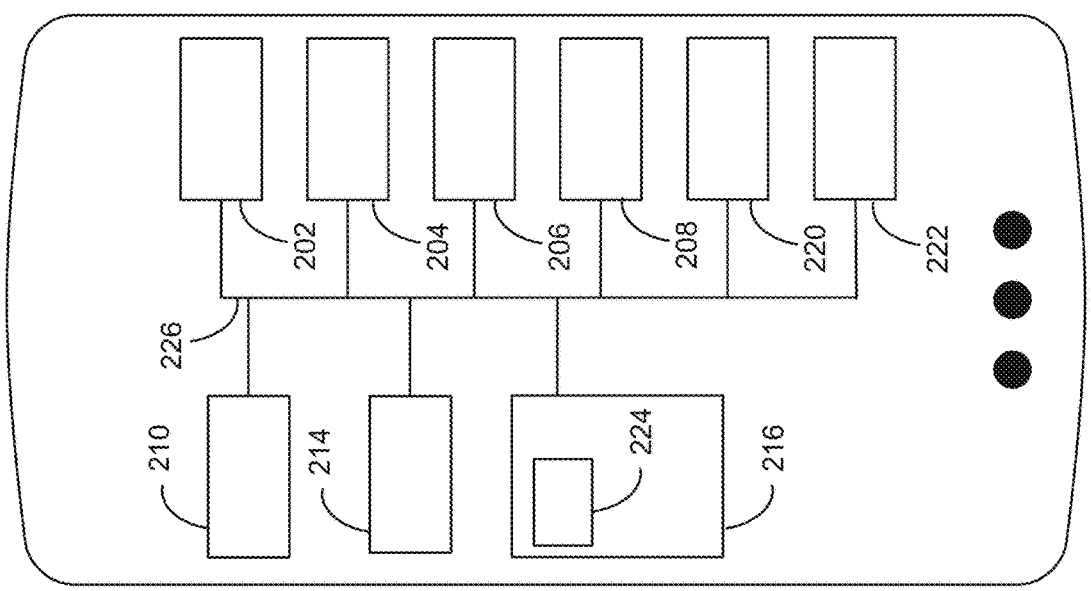
FIG. 2 is an illustration of an example computing device that can be used in connection with the communication system of FIG. 1.

Turning now to FIG. 2, an example computing device 200 is shown. Each of the computing devices shown in FIG. 1 or other computing devices that may perform one or more functions or methods described in the present disclosure can include the elements shown in FIG. 2 and described below. FIG. 2 illustrates the computing device 200 as a mobile smart phone, such as mobile computing device 116. It should be appreciated, however, that the information delivery computing device, the content server 114, the tablet computing device 108, the desktop computing device 110, and the laptop computing device 112 can also each include one or all of the elements described with respect to computing device 200.

Computing device 200 can include one or more processors 202, working memory 204, one or more input/output devices 206, instruction memory 208, a transceiver 210, one or more communication ports 214, a display 216, a camera 220 and a geolocator 222. The foregoing elements can be coupled to each other with one or more data buses 226. The data buses 226 can include wired or wireless communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like. The processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, the instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. The processors 202 can also use working memory 204 to store dynamic data created during the operation of the computing device 200. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as the food packing information requested by the customer via the computing device 200.

Display 216 can display user interface 224. User interfaces 224 can enable user interaction with computing device 200. For example, user interface 224 can be a user interface for a food information application that allows a customer to obtain information regarding a packaged food product 130. In some examples, a user can interact with user interface 224 by engaging input-output devices 206. In some examples, display 216 can be a touchscreen, where user interface 224 is displayed on the touchscreen.

Transceiver 210 allows for communication with a network, such as the network 120 of FIG. 1. For example, if communication network 120 of FIG. 1 is a cellular network, transceiver 210 is configured to allow communications with the cellular network. In some examples, transceiver 214 is selected based on the type of communication network 120 the computing device 200 will be operating in. Processor(s) 202 is operable to receive data from, or send data to, a network, such as network 120 of FIG. 1, via transceiver 210.

The camera 220 can be an optical or digital camera that can capture one or more images. The camera 220 can capture one or more elements of the indicator label that can permit the computing device 200 (e.g., mobile customer device 116) to access and/or receive the food information available via information delivery computing device 102. In other examples, the image data that can be captured by the camera 220 can be used in other manners as will be hereinafter described.

The geolocator 222 can be any suitable geolocation device that can enable the computing device 200 to determine a geographic location of the computing device 200. For example, the geolocator 222 can be geolocation software or a global positioning system (GPS) device. The geolocator 222, in some examples, can use an IP address or base stations or cellular towers of a cellular network to determine a location of the computing device 200. In other examples, the geolocator 222 can receive information from a global navigation satellite systems (GNSS) to determine a location of the computing device 200.

Figure 3:
FIG. 3 is an illustration of an example packaged food product including an indicator label in accordance with the present disclosure.

Turning now to FIG. 3, an example packaged food product 130 is shown. The packaged food product 130 can include a food item 306, a container 302, a cover 304 and the indicator label 132. In the example shown, the food item 306 is positioned inside the container 302. The cover 304 can cover an opening in the container 302 to retain the food item 306 in the container 302 and to isolate the food item 306 from the external environment in order to prevent the contamination of the food item 306. Any suitable materials can be used for the container 302 such as suitable plastics, polymers, foams, papers, cellulose materials, metals, alloys, composites and combinations thereof. The cover 304 can be made of any suitable material(s) including the previously mentioned materials for the container 302. In some examples, the cover 304 is a flexible wrap such as a transparent or translucent flexible polymer material known to those of ordinary skill in the art. In other examples, the cover 304 can be a rigid or semi-rigid lid that secures to the container 302.

In the example shown, the food item 306 is a meat product such as a NY strip steak. The apparatuses of the present disclosure are well suited for use with packaged meat products as shown in this example. The meat products can include beef products, pork products, poultry products, fish products, other seafood products, sausages, and the like. In still other examples, the food item 306 can be a food item other than a meat product such as a fruit, vegetable, grain product, dairy product, meat substitute product, or other various food items.

The indicator label 132 can be located on a viewable area of the packaged food product 130. In this manner, the indicator label 132 is viewable by a customer when the packaged food product 130 is positioned on a shelf, display case or other product display receptacle in a store, such as a grocery store. The indicator label 132 can be positioned on the packaged food product 130 so that the indicator label 132 can also be scanned or otherwise imaged with the mobile computing device 116 (e.g., a smartphone) of the customer. In this example, the indicator label 132 is positioned on a front surface of the packaged food product 130 in the upper right hand side corner. In other examples, the indicator label 132 can be positioned in other locations on the packaged food product 130.

As shown, the packaged food product 130 can be packed in different manners from that shown. In other examples, the food item 306 can be shrink wrapped in a film material or can be place inside a box, tube, bag or other suitable container. In still other examples, the food item 306 can be displayed or presented behind a counter or in a self-service station. In such instances, the indicator label 132 can be located next to or proximal to the food item 306 so that the customer can scan or otherwise image the indicator label 132 in a simple manner.

Figure 4:
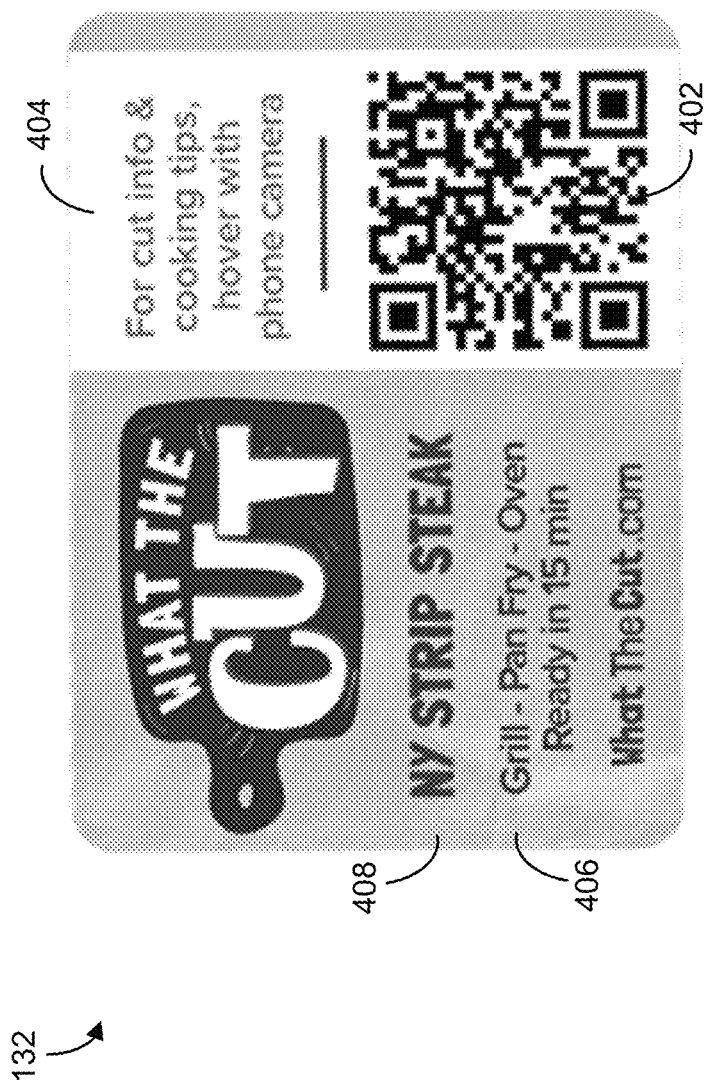
FIG. 4 is an illustration of the indicator label of FIG. 3.

As shown in FIG. 4, the indicator label 132 can include a QR code 402. The indicator label 132 can also include instructions 404 that can provide instructions to a customer regarding how to access further information regarding the food item 306. The indicator label 132 can also include title information 408 that provides the name of the food item 306 and cooking information 406. The cooking information 406 can be simple and concise cooking instructions for one method of preparation of the food item 306.

The QR code 402 can allow the customer to access information from an information delivery application via the information delivery computing device 102. To access the information delivery application, the customer can use the camera on his or her smartphone to scan or otherwise image the QR code 402. The QR code can direct the smart phone of the customer (e.g., the mobile computing device 116) to open a browser to display content at a web address. In response to such a request by the browser of the customer, the information delivery computing device 102 can deliver content to the browser in a progressive web application format.

Each type of food item 306 can have an indicator label 132 that includes the same QR code 402. Thus, the information delivery computing device 102 can deliver a progressive web application from a unique web address for each type of food item 306. Each type of food item 306 can have unique title information 408. In the example shown, the food item 306 is a NY strip steak and the information delivery computing device 102 can deliver content on a progressive web application that is located at a web address for NY strip steaks. Similarly, the information delivery computing device 102 can deliver progressive web application at unique web addresses for chicken thighs, pork chops, beef rib roasts, pork loins, turkey breasts or any other type of food item. These types of food items, in turn, each include an indicator label 132 with title information 408 identifying the food item 306 and a QR code 402 that guides the browser of the customer to request content from the respective progressive web applications at the respective web addresses.

In other examples, the indicator label 132 can include other types of bar codes or other identifying information to automatically guide the customer to the content located on the information delivery computing device 102.

Figures 5A, 5B, 5C:

When the customer accesses the web application by scanning the indicator label 132, the web application can provide a home screen 502 as shown in FIG. 5A. The home screen can display various elements of data or information. The home screen 502, in this example, displays an image 512 of the food item 306. The home screen 502, in this example, can also display an animal image 514. The animal image 514 can display to the customer the location where the food item 306 comes from on the animal. In this example, the home screen 502 displays that the food item 306 is a NY strip steak and this cut of beef comes from the loin of the animal. The home screen 502 can display other information such as recommended cooking methods, health fact information, a description of the food time 306, nutritional information, and other information that the customer may find useful when determining whether to purchase the item in the store. The customer may also scan the indicator label 132 and obtain other information after the packaged food product 130 is purchased and is taken home or to another location for preparation and consumption.

The web application can also deliver other information to the customer when the customer scrolls in the web application or otherwise navigates to other screens. FIG. 5B shows an example recipe page 504 of the web application. The recipe page 504 can display images of recipes that include the food item 306 as an ingredient. Each of the images can be clicked or otherwise selected to provide further information regarding a recipe of interest to the customer. FIG. 5C shows a recipe detail page 506 that provides further information regarding a recipe of interest.

As can be seen, the web application can deliver useful information to the customer when the indicator label 132 is scanned by the customer. The web application that is delivered by the information delivery computing device 102 can also deliver information to the customer when the customer accesses the web application in other contexts or using other methods. In one example, the customer can navigate to the web application by entering or searching for the web address using conventional web browsing and searching methods. In other examples, the web application or a link thereto can be downloaded to the customer's mobile computing device (or other personal computing device). In such instances, the customer may choose to become a registered user of the web application by entering identifying information (e.g., username and password).

In instances in which the customer navigates to the web application, the customer may desire to gather or research information about food items without having a particular food item of interest. In addition, the customer may not have navigated to the web application by scanning a QR code on a food item. In such instances, the web application can display a landing page 520 (FIG. 5D). The landing page 520 can include various filters with graphical user interfaces to allow the customer to quickly and easily navigate to a food item of interest.

In the example shown, the web application is directed to meat products. The landing page 520, in this example, includes a first filtering level 522, a second filtering level 524 and a third filtering level 526. The first filtering level 522 can filter meat products by the type of animal (e.g., beef or pork). The second filtering level 524 can filter meat products by the cut category (e.g., roast, steak, ribs, etc.). The third filtering level 526 can filter meat products by a specific cut of meat (e.g., brisket, chuck roast, center cut roast, loin roast, etc.). With the multiple levels of filtering, the customer can quickly and easily navigate to a meat product of interest. If the customer knows the particular cut, the customer can choose the cut. If the customer does not know the cut but knows the he/she prefers beef over pork, then the customer can navigate the information in the web application by filtering information by making appropriate selections.

Figure 5E:
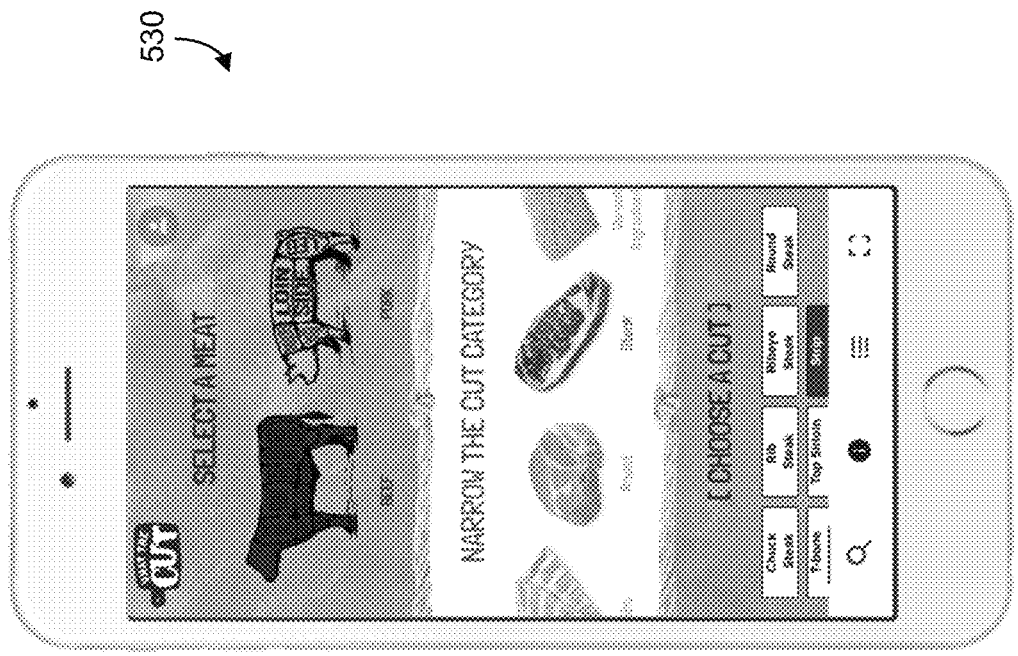
Figure 5D:
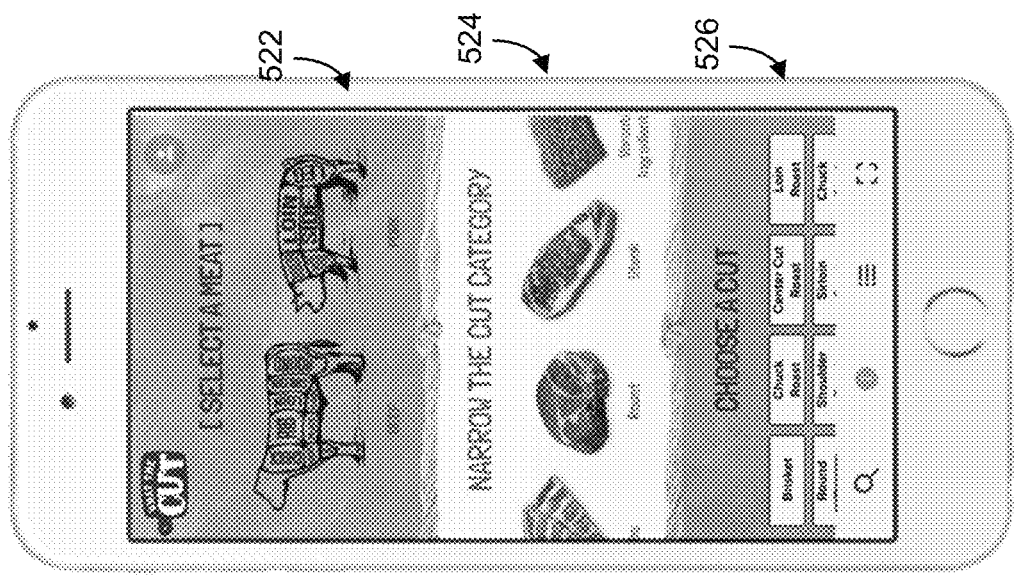

FIG. 5E displays a selected landing page 530. As can be seen, the beef selector is highlighted, the steak cut category is selected and the NY strip steak cut is highlighted. If the customer were to navigate on the web application as shown in FIG. 5E, the information shown in FIG. 5A could be displayed. In other examples, the web application can include more or less filters and/or other user interfaces than as shown.

Figure 5F:
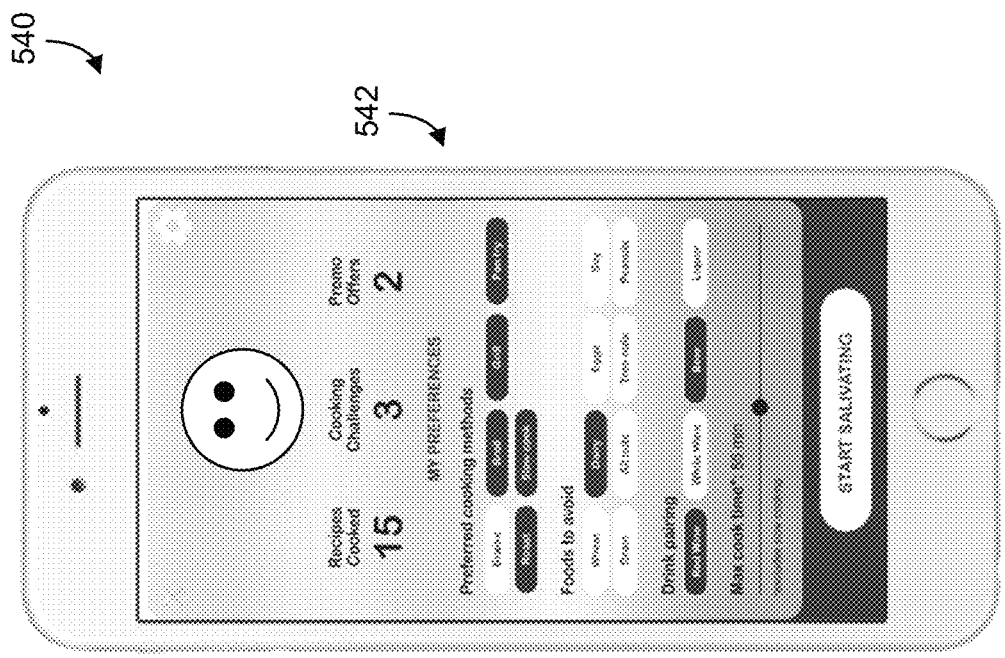

As previously described, the customer can choose to become a registered user of the web application. FIG. 5F shows an example user profile page 540 of the web application. The user profile page 540, in this example, can allow the customer to provide information about the customer's personal preferences. The personal preferences in the example shown include preferred cooking methods, foods to avoid, drink pairing preference, and a maximum cook time. These personal preferences can be used by the information delivery computing device 102 to determine recommended content to deliver to the customer.

With reference to FIG. 6, the information delivery computing device 102, for example, can include a food recommendation model 604. The food recommendation model 604 can be a trained machine learning model, for example, that can be used by the information delivery computing device 102. The food recommendation model 604 can be trained using historical data that may be collected by the information delivery computing device 102 about customers' behavior and/or interaction with the web application. The information delivery computing device 102 can collect customers' preferences and then record and/or store the different food items that a customer searches, selects, adds to favorites, or otherwise views on the web application. This data can be used to train a machine learning model to identify relationships between a customer's preferences and preferred recipes, food items, and other information available on the web application.

Any suitable machine learning tools can be used to train the food recommendation model 604 including various open source or proprietary tools known to one of ordinary skill in the art. The term model as used in the present disclosure includes data models created using machine-learning. Machine learning may involve training a model in a supervised or unsupervised setting. Machine-learning models may be trained to learn relationships between various groups of data. Machine-learning models may be based on a set of algorithms that are designed to model abstractions in data by using a number of processing layers. The processing layers may be made up of non-linear transformations. Deep-learning models may include, for example, neural networks, convolutional neural networks and deep neural networks. Such neural networks may be made of up of levels of trainable filters, transformations, projections, hashing, and pooling. The machine-learning models may be used in large-scale relationship-recognition tasks.

Once the food recommendation model 604 is trained, the food recommendation model 604 can be used as shown in FIG. 6. Customer data 602 can be input into the food recommendation model. The customer data 602, for example, can include one or more elements of data. In this example, the customer data 602 can include customer preferences as input into the user profile page 540 previously described. In the illustrated example, i elements of customer data can be input into the food recommendation model 604. Based on the input elements, the food recommendation model 604 can generate a ranked list of j recommendations as shown. In one example, the recommendations are recommended recipes from the web application's database of available recipes.

While the foregoing example, describes the food recommendation model 604. The information delivery computing device 102 can include other models that can be used to determine other recommendations or other information and content that is determined to be of interest to the customer.

With reference to FIG. 7, the information delivery computing device 102 can also be operable to deliver other types of information and communications to the mobile computing device 116 via a network 120 (not shown). While the network 120 is not shown in FIG. 7, it should be appreciated that the components shown can be coupled and/or communicate via the network 120. In the example shown, the information delivery computing device 102 can be operable to deliver shopping lists or other information to the customer that the customer can use when in a retail store, such as a grocery store.

The information delivery computing device 102, for example, can be coupled to the database 106. The database 106 can include various types of data, such as recipe data 720. The recipe data 720 can include ingredient lists for recipes that a customer may desire to prepare. The information delivery computing device 102 can also be coupled to a retailer server 702. The retailer server 702 can include information regarding prices, location, coupons, sales items, inventory and like. The information delivery computing device 102 can receive the recipe data 720 from the database 106 and information from the retailer server 702 to deliver shopping lists and related information to a customer via the mobile computing device 116.

The shopping lists and recipe information that can be sent to the customer by the information delivery computing device 102 can include ingredients that are required for preparation of a selected recipe. The information can further include the location, price and alternatives that may be available for such items. For example, a customer may be located in a grocery store and is interested in preparing a meal that includes the NY strip steak (see FIG. 3). The customer can scan the indicator label 132 on the packaged food item 130. In response, the information delivery computing device 102 can deliver the web application to the mobile computing device 116. The web application can cause the home page 502 to be displayed on the customer's mobile computing device 116. After viewing the page, the customer may decide to prepare the recipe for grilled strip steaks with blue cheese bacon butter (FIG. 5C). The user can select this recipe.

In response, the web application can determine that the customer is located in a particular store location by accessing information from the mobile computing device 116, such as location data provided by the geolocator 222. The web application can, for example, determine that the customer is located at a grocery store named Mary's Grocery Store in Chicago, Ill. The information delivery computing device 102 can, in one example, access data on Mary's Grocery Store server (e.g., retailer server 702) to obtain product inventory information, product cost information and the like. The information delivery computing device 102 can then deliver a shopping list to the customer that includes the price, location and availability of the ingredients needed to prepare the grilled strip steaks with blue cheese bacon butter recipe.

In other examples, the customer may not be located at a store but may be at work or at home and browse the web application to select a recipe. The information delivery computing device 102 can determine a store that is nearby to the customer by determining a location of the customer's mobile computing device 116 as previously described. The information delivery computing device can access a retailer server 702 to determine a nearby location and then recommend such location to the customer. In still other examples, the information delivery computing device 102 can interface with the retailer server 702 to place an order through the retailer's ordering system. The customer can then choose to either have the order of the recipe items delivered to his or her home or select to pick up the ordered recipe items at the store location.

In another example, the information delivery computing device 102 can deliver information to a customer that is based on a location of the customer and the customer's interaction with the web application. The customer may have input or selected preferences on the web application, for example. The customer may also be searching, browsing or scanning packaged food products. In response to or based on such activity by the customer, the information delivery computing device 102 can obtain product specials, product discounts or other product offers from third party retailers by accessing such information on the retailer server 702. For example, a customer may have selected a preference for grilling as a preferred method of cooking meat products. The customer may also be browsing steaks or other food items that can be cooked via a grill. The information delivery computing device 102 can retrieve data from the retailer server 702 (or data can be pushed by the retailer server 702) that indicates that a hardware store near the customer is selling grills at a reduced price. This information can be sent to the customer by the information delivery computing device 102. In some examples, the information delivery computing device 102 can use geofencing methods to deliver information to the customer based on the location of the customer.

In another example, the information delivery computing device 102 can access a customer's preferences, a customer's profile information, information regarding a customer's restricted diet, information regarding a customer's nutritional plan or information regarding other limitations or requirements for a customer's dietary needs. Such information can be related to the customer's medical conditions, desired caloric intake, a weight-loss program, a fitness goal or other personal conditions or interests. The information delivery computing device 102 can access such information from the database 106 or from a third-party server 702. Example third-parties that may host a third-party server 702 and example third-party partners that may deliver or push information to the information delivery computing device 102 can include doctors, nutritionists, fitness trainers, health service providers, pharmacies, weight loss centers, and the like.

The information delivery computing device 102 can obtain such dietary or nutritional information and can recommend particular recipes based on the restrictions that a customer may have on his or her diet. The information delivery computing device 102 can also, in some examples, deliver recommended alternative food products in response to a customer scanning a packaged food product 130 that violates or is not recommended under the customer's dietary restrictions. In addition, the information delivery computing device 102 can assist in providing dietary planning options for the customer such as tracking calories, sodium, sugar, fat or other nutritional measures that may be an element of a customer's dietary plan. The information delivery computing device 102, for example, can provide daily, weekly, monthly or other periodic planning or tracking metrics.

The information delivery computing device 102 can also access packaging data 722 that may be located in the database 106. The packaging data 722 can include data about characteristics of the packaging of the packaged food product 130. For example, the packaging data 722 can include information about the material and the recyclability of the container 302 and the cover 304 (FIG. 3). The information delivery computing device 102 can also be coupled to a recycler server 704. The recycler server 704 can include recycling data and can be operated by a third-party, a governmental entity or by the same entity that operates the information delivery computing device 102. The recycling data that may be available on the recycler server 704 can include information about the ability of the customer to recycle the packaging of the packaged food item 130.

The information delivery computing device 102 can operate to compare the packaging data 722 to the recycle data from the recycler server 704 to determine whether the packaging of the packaged food item 130 can be recycled. The customer may have entered his or her address or the information delivery computing device 102 can determine a location of the mobile computing device 116 as previously described. With this location information, the information delivery computing device 102 may be able to provide specific recycling information and instructions to the customer to describe which components of the packaging can be recycled under the customer's local recycling services.

The information delivery computing device 102 can also be coupled to a supplier server 706 and/or access supply chain data 724 from the database 106. The supplier server 706 can contain information about the manufacturing, production, farming, storage, and origin of food items. For example, the supplier server 706 can include information about the animals that were harvested to obtain certain meat products. The supplier server 706 can include information about the treatment of such animals and the diet of the animals. The supplier server 706 can also include information about the dates on which the food items were prepared, shipped and stored at the various steps in the supply chain between production and arrival at the retail store. Similar information can be included in the supply chain data 724.

This information can be delivered to the customer by the information delivery computing device 102. Customers may be interested in whether the food item includes a genetically modified ingredient, is an organic ingredient, is derived from a grass fed animal, was treated with antibiotics or other supply chain type information. The information delivery computing device 102 can deliver such information to the customer and can alert the customer if the customer scans a QR code of a packaged food product that violates one or more of the customer's preferences or settings for such supply chain or ingredient characteristics.

The information delivery computing device 102 can also be coupled to a recall server 708 and/or can access recall data 726 from the database 106. The recall data 726 and/or the information on the recall server 708 can include information that identifies food items and/or packaged food products that are the subject of a recall. The recall server 708 may be operated by an industry organization, a governmental entity or be operated by the same organization as the information delivery computing device 102. The recall data and other information can be retrieved from the recall server 708 or from the database 106 or the recall data and other recall information can be pushed to the information delivery computing device 102. The information delivery computing device 102 can send the recall data to the customer on the mobile computing device 116.

In some examples, the information delivery computing device 102 can store the packaged food products that a customer has scanned, searched, browsed, or otherwise viewed via the web application delivered by the information delivery computing device 102. The information delivery computing device 102 can alert such customers when the information delivery computing device 102 obtains recall data that indicates that the packaged food product that was scanned, searched or viewed by the customer has been recalled. In this manner, the information delivery computing device 102 can target recall communications to customers that are most likely affected in the recall.

In still other examples, the customer can obtain assistance from the information delivery computing device 102 to determine whether a packaged food product 130 that the customer has purchased is the subject of a recall. For example, the customer can navigate to the web application on his or her mobile computing device 116. The customer can scan the QR code on the packaged food product 130 or scan another bar code or other identifying information (e.g., supplier code, manufacturing/processing identifier) on the packaged food product 130 using the camera on the mobile computing device 116. The information delivery computing device 102 can compare the data from the scan or image to the recall data or to the information from the recall server 708. If the information delivery computing device 102 determines that the packaged food product 130 is the subject of a recall, the information delivery computing device 102 can send an alert or other communication to the mobile computing device 116 of the customer.

In other examples, the information delivery computing device 102 can include other functionality to provide further benefits to the customer. In one example, the information delivery computing device 102 can include a food item identification engine (not shown). The food item identification engine can be operable to identify a food item when the customer captures an image of the food item with the camera of the mobile computing device 116. In this example, the customer does not need to scan the indicator label 132. Instead, the customer can capture an image of the food item through the packaging. The food item identification engine can be a trained machine-learning model that can identify the type of food item from the image captured by the customer. The food item identification engine can be a trained using a data set of known food items. The web application can allow the customer to deliver the image data of the captured food item to the information delivery computing device 102. The information delivery computing device can use the food item identification engine to determine the type of food item and then deliver the appropriate web application and/or content to the mobile computing device 116.

In still another example, the information delivery computing device 102 can include a food item characteristic identifier. The food item characteristic identifier can be operable to determine one or more characteristics of a food item. In this example, the customer can capture an image of a food item but instead of identifying the type of the food item, the food item characteristic identifier can determine one or more characteristics of the food item. Such characteristics can include, for example, a size of the food item, a weight of the food item, a thickness of the food item or the like. Such characteristics of the food item can be used by the information delivery computing device 102 to determine and deliver customized preparation/cooking instructions. The food item characteristic identifier can be a trained machine learning model and can be trained in a similar manner to that described above.

The foregoing functionality of the web application can be delivered using any suitable architecture. In one example, the information content delivery computing device 102 can be structured in the architecture shown in FIG. 8. In this example, the web application can be delivered via a managed cloud-based service. As shown, a request from the mobile computing device 116 can be received by the information delivery computing device 102. The information delivery computing device 102 can include a DNS resolution device 802 that can determine the IP address that is indicated by the information in the indicator label 132. The information delivery computing device 102 can also include a cloud manager 804 that can be used to manage the delivery of the content and other information. Static content 806 can be coupled to the cloud manager 804. Static content 806 can be stored on a suitable server or other computing device and be delivered to the mobile computing device 116 as part of the web application.

The information delivery computing device 102 can also include a first elastic load balancer 808. The elastic load balancer 808 can adjust the delivery of information for the web layer 810. The web layer 810 of the web application can be stored and delivered via one or more clusters or servers. In the example shown, the information delivery computing device includes a first web layer cluster 812 and a second web layer cluster 814. In other examples, the web layer 810 can include other numbers of web layer clusters as may be required by the traffic and number of requests for the delivery of content from the web application.

The information delivery computing device 102 can also include a second elastic load balancer 816. The second elastic load balancer can adjust the delivery of information for the application layer 818. The application layer 818 of the web application can be stored and delivered via one or more clusters or servers. In the example shown, the information delivery computing device 102 includes a first application layer cluster 820 and a second application layer cluster 822. In other examples, the application layer 818 can include other numbers of application layer clusters as may be required by the traffic and number of requests for the delivery of content from the web application. The information delivery computing device 102 can also include a relational database 824. The architecture shown in FIG. 8 shows one example architecture of the information delivery computing device 102. In other examples, other suitable architectures as known to one of ordinary skill in the art can also be used.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of delivering information to a mobile computing device regarding a packaged food product, the method comprising:

receiving a request from a mobile computing device for information regarding a packaged food product, wherein the request is generated in response to a customer capturing image data from an indicator label on the packaged food product with the mobile computing device; and sending information about one or more characteristics of the packaged food product to the mobile computing device via a progressive web application that comprises a graphical user interface, the graphical user interface including a plurality of filtering levels to allow the customer to navigate to a food item of interest;

wherein the plurality of filtering levels comprise a first filtering level allowing the filtering of meat products by a type of animal, a second filtering level allowing the filtering of meat products by cut categories, and a third filtering level allowing the filtering of meat products by specific cut.

2. The method of claim 1, wherein the one or more characteristics of the packaged food product comprises recall data that identifies whether the packaged food product is included in a recall of packaged food products.

3. The method of claim 2, further comprising obtaining the recall data from a recall data source.

4. The method of claim 1, further comprising storing information identifying the customer or the mobile computing device and sending an alert to the customer or the mobile computing device in response to determining that the packaged food product is included in a recall of packaged food products.

5. The method of claim 1, wherein the one or more characteristics of the packaged food product identifies a type of food contained in the packaged food product and a recommended cooking method for the packaged food product.

6. The method of claim 1, further comprising:
storing customer behavior data characterizing the customer's activity with the progressive web application;
training a food recommendation model using the stored customer behavior data; and
determining a food recommendation using the trained food recommendation model.

7. The method of claim 1, wherein the graphical user interface comprises one or more graphical depictions of the one or more characteristics of the packaged food product.

8. The method of claim 1, further comprising:
obtaining one or more customer preferences from the mobile computing device; and
sending a food recommendation to the mobile computing device based on the one or more customer preferences and the one or more characteristics of the packaged food product.

9. The method of claim 1, further comprising:
obtaining recipe data from a recipe database; and
sending an ingredient list to the mobile computing device with the one or more characteristics of the packaged food product.

10. An information delivery system comprising an information delivery computing device connected to a communication network, the information delivery computing device configured to:
receive, via a transceiver, a request from a mobile computing device for information regarding a packaged food product, wherein the request is generated in response to a customer capturing image data from an indicator label on the packaged food product with the mobile computing device; and
display on the mobile computing device a progressive web application comprising information identifying one or more characteristics of the packaged food product, the progressive web application comprising a graphical user interface that includes a plurality of filtering levels to allow the customer to navigate to a food item of interest;
wherein the plurality of filtering levels comprise a first filtering level allowing the filtering of meat products by a type of animal, a second filtering level allowing the filtering of meat products by cut categories, and a third filtering level allowing the filtering of meat products by specific cuts.

11. The information delivery system of claim 10, wherein the one or more characteristics of the packaged food product comprises recall data that identifies whether the packaged food product is included in a recall of packaged food products.

12. The information delivery system of claim 11, wherein the information delivery computing device is configured to obtain the recall data from a recall data server.

13. The information delivery system of claim 11, wherein the information delivery computing device is configured to:
store customer data identifying the mobile computing device;
store historical data identifying packaged food products viewed by the customer; and
send an alert to the mobile computing device when the information delivery computing device determines that a packaged food product viewed by the customer is included in a recall of packaged food products.

14. A non-transitory computer readable medium comprising executable instructions stored thereon, wherein the executable instructions, when executed by a processor of a computing device, cause the computing device to perform operations comprising:
receiving a request from a mobile computing device for information regarding a packaged food product, wherein the request is generated in response to a customer capturing image data from an indicator label on the packaged food product with the mobile computing device; and
sending information to be displayed in a progressive web application on the mobile computing device that identifies one or more characteristics of the packaged food product, the progressive web application comprising a graphical user interface, the graphical user interface including a plurality of filtering levels to allow the customer to navigate to a food item of interest;
wherein the plurality of filtering levels comprise a first filtering level allowing the filtering of meat products by a type of animal, a second filtering level allowing the filtering of meat products by cut categories, and a third filtering level allowing the filtering of meat products by specific cut.

15. The non-transitory computer readable medium of claim 14, wherein the one or more characteristics of the packaged food product comprises recall data that identifies whether the packaged food product is included in a recall of packaged food products.

16. The non-transitory computer readable medium of claim 14, wherein the executable instructions, when executed by the processor of the computing device, cause the computing device to perform further operations comprising:
storing customer data identifying the customer and the mobile computing device;
storing historical data identifying packaged food products viewed by the customer; and
sending an alert to the mobile computing device when a packaged food product viewed by the customer is included in a recall of packaged food products.

17. The non-transitory computer readable medium of claim 14, wherein the executable instructions, when executed by the processor of the computing device, cause the computing device to perform further operations comprising:
obtaining from the mobile computing device one or more customer preferences; and
sending a food recommendation to the mobile computing device based on the one or more customer preferences and the one or more characteristics of the packaged food product.

* * * * *